No. 629,946. Patented Aug. 1, 1899.
T. VON ZWEIGBERGK.
SPEED INDICATOR.
(Application filed Apr. 11, 1898.)

(No Model.) 2 Sheets—Sheet 1.

WITNESSES:
E. B. Gilchrist
Philip E. Knowlton

INVENTOR
Thorsten von Zweigbergk,
BY Thurston & Bates
his ATTORNEYS.

No. 629,946. Patented Aug. 1, 1899.
T. VON ZWEIGBERGK.
SPEED INDICATOR.
(Application filed Apr. 11, 1898.)
(No Model.) 2 Sheets—Sheet 2.
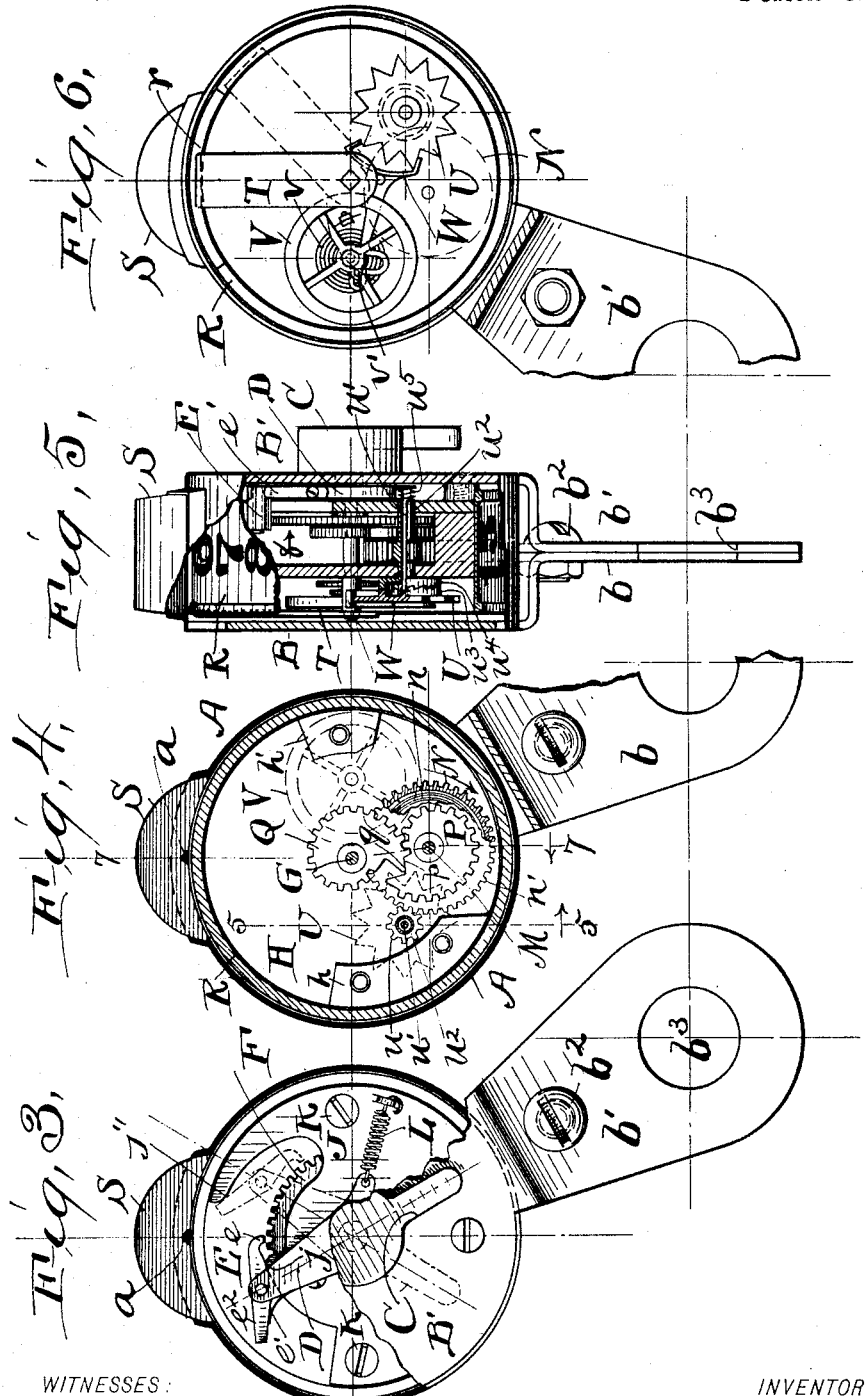
WITNESSES:
E. B. Gilchrist
Philip E. Knowlton
INVENTOR
Thorsten von Zweigbergk
BY
Thurston & Bates,
ATTORNEYS

UNITED STATES PATENT OFFICE.

THORSTEN VON ZWEIGBERGK, OF CLEVELAND, OHIO.

SPEED-INDICATOR.

SPECIFICATION forming part of Letters Patent No. 629,946, dated August 1, 1899.

Application filed April 11, 1898. Serial No. 677,171. (No model.)

*To all whom it may concern:*

Be it known that I, THORSTEN VON ZWEIGBERGK, a subject of the King of Sweden and Norway, residing at Cleveland, in the county of Cuyahoga and State of Ohio, have invented a certain new and useful Improvement in Speed-Indicators, of which the following is a full, clear, and exact description, reference being had to the accompanying drawings.

My invention is for a speed-indicator, and though its uses are manifold it is especially designed for use on bicycles.

It consists, broadly, of an indicating member combined with two sets of mechanism, one operated by the movement of the device whose speed is to be measured and the other operated independently thereof, and one operating to move the indicating member in one direction and the other operating to return it, and one operating through intermediate mechanism, including a spiral member, whereby its effect increases as the other succeeds in moving the indicating member, the result of which is that there exists an equilibrium position for the indicating member which is dependent upon the speed of the device being measured.

More specifically, the invention consists in the combination, with an indicating member, of a suitable tappet adapted to be hit by an exterior moving device and operating through intermediate gearing to move the indicating member in one direction and a spring acting through intermediate mechanism, including a spiral member, and thus tending to retract the indicating member, with an effect which increases as the tappet advances the indicating member.

The invention includes other features, which may be best summarized as consisting in the combinations of parts hereinafter specified, and definitely enumerated in the claims.

The drawings clearly disclose the invention embodied in a form which is applicable to a bicycle.

Figure 1:
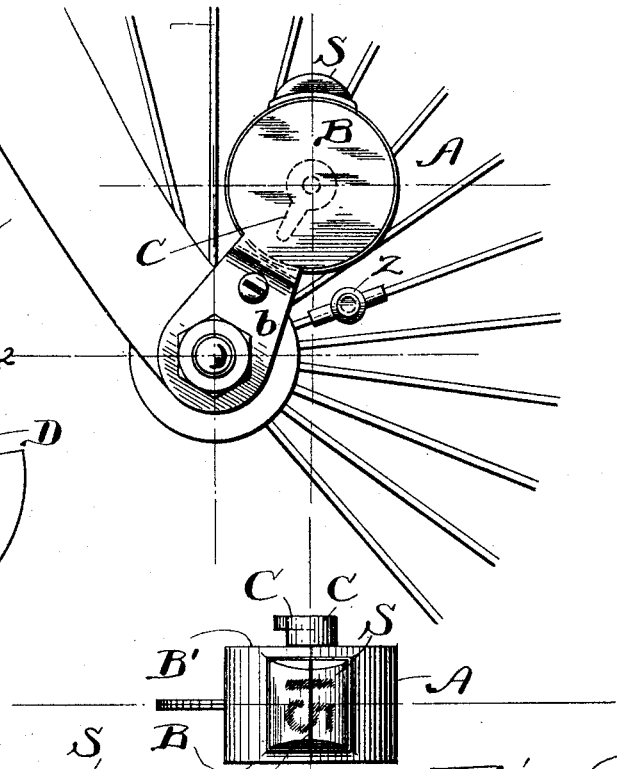
Figure 8:
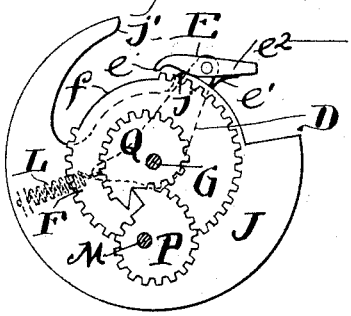
Figures 2, 7:
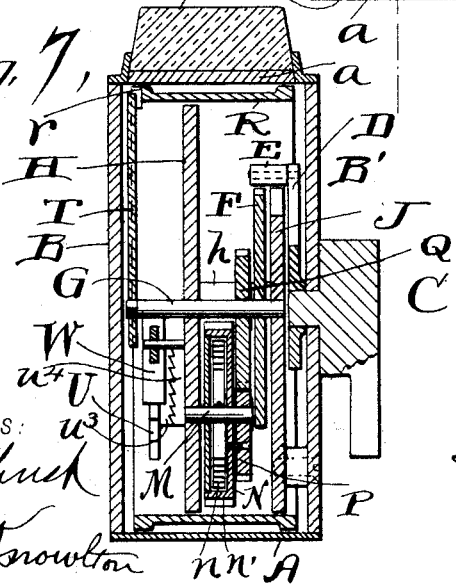

Figure 1 is a side elevation of the speed-indicator in place at the axle of the front wheel of a bicycle. Fig. 2 is a plan of such indicator. Fig. 3 is a side elevation, on an enlarged scale, of the indicator, looking at the inner side thereof, part of the cover-plate being broken away. Fig. 4 is a similar view of the indicator with the cover-plate, the next internal plate J and the parts it carries removed, the indicating-ring being shown as cut through the rib on its edge. Fig. 5 is a transverse section of the indicator on the line 5 5 of Fig. 4, looking toward the central line. Fig. 6 is a side elevation of the outer side of the indicator, with the cover-plate B removed. These latter four figures are all on the same scale, which is twice that shown in Figs. 1 and 2. Fig. 7 is a transverse section, on a still larger scale, on the line 7 7 of Fig. 4, looking in the direction of the arrow. Fig. 8 is a detached view of the plate J, the parts immediately in front of and behind it, looking from the position of the arrow marked 8 in Fig. 5.

The same letters of reference designate the same parts on all the figures.

The indicating mechanism is inclosed within a suitable casing, which consists of a drum A and a pair of plates B B', which act as heads to that drum. When the indicator is designed for use on a bicycle, these plates are continued beyond the drum in the form of arms $b$ $b'$, which are brought together and secured by the bolt $b^2$. A hole $b^3$ is provided through these plates which is adapted to fit over the projecting end of the axle of the front wheel, whereby the indicator may be clamped in place by the nut screwing onto the end of that axle, as shown in Fig. 1. A suitable pin Z is attached to a spoke of the wheel in such position that as the wheel revolves the pin will hit a tappet-arm C, carried by the indicator, and move the same until the pin clears it, and thereby operate the internal mechanism.

The tappet-arm C referred to is suitably journaled in the plate B' at its center, and at the inner end of its axis carries the arm D. On the end of this arm is a dog E, having a nose $e$, which is adapted to take between the teeth of a gear-wheel F. This gear-wheel is rigidly secured on a shaft G, which is journaled in a pair of plates H and J, the former of which carries distance-blocks $h$ and $h'$, which bear against the latter plate and to which the latter plate is secured by screws K. The plate J is secured by similar lugs and screws to the plate B', wherefore this last-mentioned plate supports the whole internal mechanism.

The arm D normally stands in the position shown in Fig. 3 under the influence of the spring L, secured to a lug projecting from that arm and to the plate J. The dog E, which is adapted, as stated, to engage with the gear-wheel F, is normally held out of such engagement by the shoulder $j$ on the plate J coming under that dog. As the arm D, however, is advanced the dog passes off of that shoulder, and a spring $e'$ acting on the dog causes its nose $e$ to engage with the teeth of the gear-wheel, whereupon the continued movement of the arm D turns the gear-wheel upon its axis. After this turning has proceeded the amount required the tail $e^2$ of the dog hits against the overhanging shoulder $j'$ of the plate, which draws the dog out of engagement with the teeth of the gear-wheel. This latter position is shown in dotted lines in Fig. 3.

The arm D being rigid with the shaft of the tappet C is of course moved by that tappet when the pin Z strikes the latter. The operation of such striking, therefore, is to cause the dog E to move forward and then pass into engagement with the wheel F and move that wheel a short distance and then pass out of such engagement. This provision for allowing some idle movement of the dog at each end of its stroke while it is free from the wheel F obviates the necessity of setting the pin Z with extreme nicety. It is only necessary that that pin be so set as to move the dog through its effective stroke, and it will be seen that there is considerable leeway between this and the maximum stroke of the dog.

Journaled on a shaft or pin M, projecting from the plate H, is a drum N, having in its interior a spiral spring $n$, one end of which is secured to the inner side of the periphery of the drum and the other end to the journal-pin. This spring tends to rotate the drum in the direction of the arrow shown in Fig. 4. Rigid with the drum on the side thereof opposite the plate H and journaled on the same shaft M is the spiral gear P, the spiral of whose periphery convolutes in the opposite direction to the spiral spring $n$.

Rigidly secured to the shaft G, and hence turned by that shaft when the wheel F is turned, is a spiral gear Q, which meshes with the spiral gear P, to which it corresponds. These spiral gears are alike, except reversed, and are constructed on the principle that the sum of the greatest and least radii and of the next to the greatest and the next to the least radii, &c., are always a constant, and this sum is equal to the distance between the shafts M and G, from which it results that the gears are always in mesh, while as the gears rotate from their normal positions, as shown in Fig. 4, the radius of the gear Q continually decreases and that of the gear P continually increases, wherefore the more the wheel P is rotated by the spring in unwinding the greater becomes its lever-arm and the greater is the movement it communicates to the shaft G for a given movement of the spring and drum.

Loosely surrounding the internal mechanism within the casing is the indicating member R, which is in the form of a ring and has a series of numbers arranged in order about its periphery. Any one of these numbers, depending upon the position of the ring, may be observed through a suitable opening in the upper portion of the drum A, in which opening is preferably placed a magnifying-glass S.

Rigidly secured to the end of the shaft G is an arm T, which takes in an elongated notch $r$ in the indicator-ring. From what has been described it will be seen that as the pin Z operates the tappet C the dog E advances the wheel F, and this will turn the arm T and move the same through the notch $r$, and if it hits against the end of that notch shift the indicator-wheel. As soon as the pin Z has cleared the tappet C the spiral spring $n$, rotating the drum N, draws the arm T in the opposite direction and may shift the ring R. As the speed of the rider increases the tappet will operate more rapidly and the arm T be swung forward, and the spring $n$ will not have time to swing it back far before the pin Z again hits the tappet; but the faster this pin hits the tappet, and hence the more it succeeds in keeping the wheel F rotated beyond the position which the spiral spring would normally turn it, the greater the lever-arm which the spring has in tending to draw the arm T backward, owing to the spiral gear. Hence a period of equilibrium will be reached which will leave the ring R in substantially a stationary position, the arm T simply oscillating back and forth within the notch $r$.

The series of numbers on the ring extends in the direction from the point toward which the tappet moves it to that toward which the spring tends to return it. If the speed of the rider decreases, the spring $n$ has the advantage and rotates the ring backward, thus showing a lower number through the glass, whereas if the speed increases the tappet operates to gain on the speed and the ring is rotated to disclose a larger number through the glass S. It will thus be seen that the shifting of the ring is proportionate to the change in speed of the rotation of the wheel which is being measured, and if the marks on that ring are in some proper denomination it may show the actual speed of the device being measured. For an indicator to be used on a bicycle those marks would preferably be in the number of miles per hour. The form shown in the drawings contemplates a series of numbers around the periphery of the ring, ranging from "5" to "25," between which limits would be the speed of a wheel in any ordinary cases. A bar $a$, carried by the drum A, extends across the center of the magnifying-glass and forms a convenient measuring-point for estimating the fractions of a mile per hour.

In order that the spiral spring $n$ may operate the drum N regularly, I provide a suitable escapement mechanism. This, as shown, consists of an ordinary clock-escapement, as follows: first, the rotatable escapement-wheel U, having a pinion $u$, which engages with gear-teeth $n'$ on the periphery of the drum N; second, a balance-wheel V, suitably journaled and having a hair-spring $v$ secured at one end of its shaft and at the other end adjustably to a stationary point; third, an escapement-lever W, suitably pivoted and engaging at one end with the escapement-wheel and at the other end with a pin $v'$, projecting from the balance-wheel. Thus a steady unwinding of the spring $n$ and the consequent constant rotation of the drum N is provided when the pin Z is out of engagement with the tappet.

To allow the tappet acting through the spiral gear Q to rotate the drum backward without interfering with the escapement, I provide a slip connection between the pinion $u$ and the escapement-wheel U. This slip connection is established by making the pinion on a tubular shaft $u^2$, which fits over the shaft $u'$, carrying the escapement-wheel, and by placing a clutch member $u^3$, having a ratchet-face, on the escapement-wheel and a corresponding clutch member $u^4$ on the sleeve. A spring $u^5$, surrounding the projecting end of the shaft $u'$ and bearing against the end of the sleeve $u^2$, normally keeps the two clutch members in engagement. Thus when the pinion $u$ is rotated by the unwinding of the drum N the escapement-wheel is also rotated; but when the drum N is turned backward by the wheel Q the escapement-lever W holds the escapement-wheel from rotating, and the sleeve $u^2$ and its clutch member $u^4$ are thus rotated idly, the escapement-wheel being simply forced outward (to the left in Fig. 5) as the ratchet-teeth of the clutch member $u^4$ slip over those on the clutch member $u^3$.

In order to prevent the spring from unwinding when the indicator is idle or the bicycle running at less than five miles per hour, in the case under consideration, I provide the spiral gears with the coöperating locking-surfaces $q$ and $p$, which limit the movement between them, as shown in Fig. 4. The corresponding surfaces on these gears also engage when the ring R has been moved to its other limit—that is, twenty-five miles per hour—as shown in Fig. 8. In order to prevent breakage of the parts should the wheel be rotated faster than that speed, I strip the teeth from that portion of the wheel F which comes into position to be acted upon by the dog E at the twenty-five-mile-per-hour speed. This allows the movement of the dog back and forth without causing the movement of that wheel. This stripped portion of the wheel F is shown at $f$ in Fig. 8.

It will be noticed that the escapement mechanism is at that side of the indicator which is covered by the plate B, which does not carry any of the internal mechanism. Therefore a simple removal of this plate renders the escapement accessible for regulation.

Having described my invention, I claim—

1. In a speed-indicator, the combination, with suitable supports, of mechanism adapted to be operated by the movement of the device whose speed is to be measured, an arm connected with said mechanism and moved thereby through a definite distance for each rotation of the device to be measured, a spring operating to retract said arm, whereby it is given an oscillation, an indicating member so connected with the arm that the arm does not move it when the path of oscillation of the arm is not changed but does move it if that path is changed, said spring operating to move said arm rearward a greater or less distance than it moved forward according to the amount of time said spring is allowed to act whereby the path of oscillation of the arm is shifted forward as the speed of rotation increases and rearward as it decreases, substantially as described.

2. In a speed-indicator, in combination, an indicating member, tending to remain in an indeterminate position, a suitable tappet adapted to be moved by an exterior moving device, an arm adapted to move said indicating member, said arm being adapted to occupy different positions relative to the tappet and being so connected with the tappet that it is moved forward a definite amount for a definite movement of the tappet irrespective of the position which said arm occupies when the forward movement begins, there being play between said arm and the indicating member as great as the movement of said arm, and regulated mechanism adapted to move said arm in the contrary direction to that in which the tappet moves it, substantially as described.

3. In a speed-indicator, in combination, an indicating member, mechanism adapted to move said member forward, a reciprocating tappet adapted to be operated intermittently in one direction by the movement of the device whose speed is to be indicated for moving such mechanism, a spring, means for governing the retraction thereof without interfering with the connection between the tappet and the indicating member, a connection between the spring and the indicating member whereby the spring tends to move said member rearward, said connection including a spiral member whereby the spring may retract regularly but a given distance of its retraction produces on the indicating member a retraction the amount of which increases as the movement of the indicating member forward from its initial position increases, substantially as described.

4. In a speed-indicator, in combination, an indicating member, a spring, a spiral gear P which the spring tends to rotate, a spiral gear Q in mesh with the gear P, suitable connection between the spiral gear Q and the indicating member whereby that gear may move that member, and means adapted to be operated by the movement of the device whose speed is to be indicated for rotating the gear Q, substantially as described.

5. In a speed-indicator, in combination, an indicating member, a spring, a pair of coöperating spiral gears, a suitable connection between one gear and the indicating member whereby that gear may drive that member, and a suitable connection between the other gear and the spring whereby the retractile force of the spring may drive that gear, an escapement mechanism regulating the spring's retraction, and mechanism for operating the gear connected with the indicating member, which mechanism is adapted to receive movement from the device whose speed is to be indicated, substantially as described.

6. In a speed-indicator, in combination, a shaft G, a spiral gear Q thereon, a second spiral gear P in mesh with the gear Q, a spring tending to rotate the spiral gear P in one direction, an indicating member, a suitable connection between the shaft G and that member, the wheel F on the shaft G, and means adapted to be actuated by the movement of the device whose speed is being measured for moving said wheel F in the direction opposite to that which said spring tends to move it through the spiral gears, substantially as described.

7. In a speed-indicator, in combination, a shaft, an arm T secured thereto, an indicating member R adapted to be engaged by said arm and moved by it, there being play in said engagement whereby said arm may move some distance without affecting said indicating member, and operating mechanism adapted to rotate said shaft a definite distance for each actuation of the operating mechanism, a spring tending to rotate said shaft in the opposite direction at a rate which increases with the increase of degrees of rotation given said shaft by the operating mechanism, substantially as described.

8. In an indicator, an indicating member, a movable tappet adapted to cause movement of said member in one direction, the connection between said tappet and the said member being released if said tappet moves more than its desired travel, whereby it is unnecessary to regulate the movement of the tappet to an exact amount to produce an exact effect on the indicating member, substantially as described.

9. In a speed-indicator, in combination, a suitable tappet, an arm D operated thereby, a dog E carried by said arm, a wheel F with which said dog is adapted to engage, shoulders $j\,j'$ preventing the engagement of said dog when the arm D begins its movement and withdrawing said dog from such engagement before the wheel ends its movement, and a suitable indicating member adapted to be moved by the movement of said wheel F, substantially as described.

10. In a speed-indicator, in combination, a drum, a spiral spring within the same tending to rotate the drum, gear-teeth on the periphery of the drum, an escapement mechanism having a pinion gearing with said teeth whereby when said spring unwinds it must do so regularly, a spiral gear P rigid with said drum, a spiral gear Q meshing with the gear P, an indicating member, suitable connecting mechanism between such member and the gear Q, and mechanism adapted to be operated by the movement of the device whose speed is being measured for moving said member in the opposite direction to that caused by said spring, substantially as described.

11. In a speed-indicator, in combination, a spiral spring, an escapement mechanism connected therewith and preventing the irregular unwinding of the spring, a slip connection between the spring and the escapement mechanism whereby the spring may be wound up without operating the escapement mechanism, an indicating member, mechanism for moving the same in a direction to indicate greater amounts, suitable connection between said spring and said indicating member whereby the spring is adapted to move the indicating member in a direction to indicate less amounts, substantially as described.

12. In a speed-indicator, in combination, a wheel F having teeth on its periphery, an oscillatable arm D, a dog carried thereby adapted to engage with the teeth on the wheel F, an indicating member adapted to be moved by said wheel F to its limit in at least one rotation of said wheel F, the teeth on said wheel with which said dog would engage after said indicating member had reached its limit being omitted, whereby the dog may move more rapidly than the maximum speed which the device is intended to indicate without causing breakage, substantially as described.

13. In a speed-indicator, in combination, a suitable casing, consisting of a drum A and a pair of side plates B B', an opening in said drum, a ring within the drum having numbers on its periphery, a tappet-arm on the outer side of the plate B', mechanism connecting the same with the ring whereby the tappet is adapted to move the ring to display numbers of continuously higher value until the limit of the series on the ring is reached, and means within the drum tending to rotate said ring in the opposite direction, substantially as described.

In testimony whereof I hereunto affix my signature in the presence of two witnesses.

THORSTEN VON ZWEIGBERGK.

Witnesses:
PHILIP E. KNOWLTON,
ALBERT H. BATES.